1

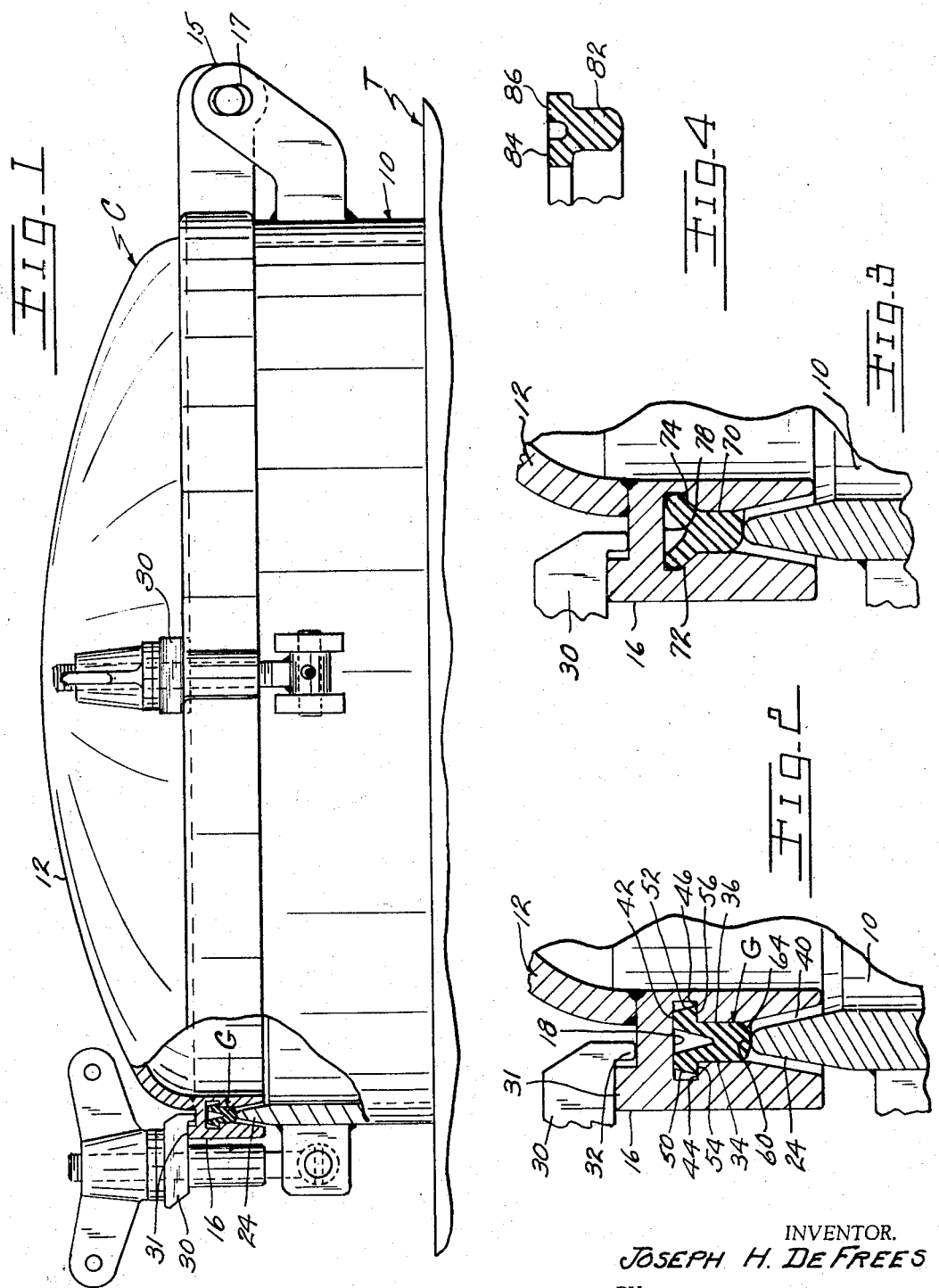

3,441,166
TANK MANHOLE CLOSURE
Joseph H. De Frees, 414 Liberty St., Warren, Pa. 16365
Continuation-in-part of application Ser. No. 501,306, Oct. 22, 1965, now Patent No. 3,339,791. This application July 3, 1967, Ser. No. 650,717
Int. Cl. B65d 53/02
U.S. Cl. 220—46                                          5 Claims

ABSTRACT OF THE DISCLOSURE

A closure structure for a fluid-containing tank having in its upper portion a manhole aperture defined by an upwardly projecting endless peripheral collar. The closure structure includes a cover member hinged to the peripheral collar and engageable with the top edge thereof and having on its peripheral portion an endless peripheral ring having an endless peripheral groove formed in its under surface for coacting sealing engagement with the top edge of the collar. A resilient gasket is disposed in the groove for sealing the joint between the cover member and the wall. The gasket is substantially V-shaped in cross-sectional configuration with the legs of the V extending upwardly and outwardly into the groove. The groove is substantially T-shaped in cross-sectional configuration with the stem of the T forming the groove entrance and with the cross of the T forming the inner portion of the groove and extending laterally to form spaced upwardly facing shelves interiorly of the groove. Each of the legs of the V-shaped gasket have outwardly extending tabs forming downwardly facing shoulders for coacting engagement with the groove shelves, respectively, to securely retain the gasket within the groove.

At least one manually adjustable clamp is rotatively secured to the collar and is positionable over the ring portion of the cover to clamp the same firmly on the collar.

---

This invention relates to manhole closures, and more particularly to closures for manholes on tanks used for the storage or transportation of liquids.

This application is a continuation-in-part of my copending application Ser. No. 501,306 filed Oct. 22, 1965, now U.S. patent No. 3,339,791.

Conventional liquid storage and transportation tanks have full-opening manholes. Two primary objections with the covers on such manholes are the positioning of the cover gasket and the method of engaging the hold-down bolts to the cover.

With respect to the gasket, under present practice the gasket is placed in an upwardly facing groove formed around the periphery of the manhole with the outer peripheral edge of the cover seating on such gasket in fluid-tight sealing relation. With this construction, the upwardly facing groove, with the gasket therein, readily collects not only the product being stored or hauled, but also water, ice and dirt thus causing premature deterioration of the gasket and, in turn, premature failure of the fluid-tight seal therebetween. Also, prior gaskets are easily dislodged from the groove.

With respect to the bolts, under current practice a number of individual lugs are welded to the cover, such lugs being engaged by a plurality of hold-down swing bolts welded to the tank. Such bolts are not only expensive, but cause objectionable distortion at the point of welding. Additionally the projection of the lugs is objectionable from a safety standpoint.

Therefore, it is an object of the inveniton to provide a liquid-containing tank manhole closure having a groove-sealing gasket structure forestalling premature deterioration of the gasket.

A further object of the invention is to provide a closure of the above type wherein water, ice, dirt or the product being stored cannot collect in the groove-sealing gasket structure.

A further object of the invention is to provide a groove-sealing gasket structure of the above type wherein the gasket is securely retained in the groove and will not be dislodged therefrom even under abnormal operating conditions.

A further object of the invention is to provide a manhole closure of the above type employing a minimum of hold-down bolts, said bolts functioning without projecting lugs.

A further object of the invention is to provide a manhole closure of the above type that is simple in construction, inexpensive to manufacture and highly effective in operation.

Briefly, the foregoing objects are accomplished by the provision of a closure means for a liquid storage or transportation tank having in its upper portion a manhole aperture defined by an upwardly projecting endless peripheral collar. The closure means includes a lid or cover hinged to the collar and swingably engageable with the top edge thereof. The peripheral portion of the cover is formed into an endless peripheral ring having a continuous circumferential groove formed in its lower or under surface and having a gasket therein for coacting sealing engagement with the top edge of the collar to form a fluid-sealing joint therewith. The gasket is substantially V-shaped in cross-sectional configuration with the legs of the V extending upwardly and outwardly into the groove. The groove is substantially T-shaped in cross-sectional configuration with the stem of the T forming the groove entrance and with the cross of the T forming the inner portion of the groove and extending laterally to each side to form spaced upwardly facing shelves interiorly of the groove. Each of the legs of the V-shaped gasket have outwardly extending tabs forming downwardly facing shoulders for coacting engagement with the groove shelves, respectively, to securely retain the gasket within the groove. Insertion of the gasket into the groove is effected by pressing the legs of the V-shaped gasket together and inserting the same entirely into the groove whereby the gasket shoulders seat on the groove shelves, respectively. The upper edge portion of the collar is tapered upwardly and inwardly and terminates in a rounded upper edge. The groove entrance is tapered downwardly and outwardly for receiving the tapered upper edge portion of the collar, with the bottom portion of the gasket being rounded for coacting sealing engagement with the rounded upper edge of said collar. At least one manually adjustable clamp is rotatively secured to the collar and positionable over the ring portion of the cover to clamp the same firmly on the collar.

With this construction, there is provided a fluid storage tank manhole closure wherein premature deterioration of the manhole gasket is prevented. The closure is relatively light in weight, is bubble tight, provides a low silhouette and is easily cleaned. Only low sealing forces are required and the cover is self-aligning with the tank collar.

Other objects and advantages of the invention will be apparent from the following description taken in conjunction with the drawings wherein:

FIGURE 1 is a side elevational view, partly in section, of a liquid storage tank manhole closure constructed in accordance with the invention;

FIGURE 2 is an enlarged sectional view of the gasket shown in FIG. 1;

FIGURE 3 illustrates a modification of the gasket shown in FIG. 2; and

FIGURE 4 illustrates a further modification of the gasket shown in FIG. 2.

Although the invention is shown and described herein with reference to liquid storage and transportation tanks, it will be understood that it may be applied to any type of fluid-holding tank or container.

Referring first to FIGURE 1, there is shown a tank manhole closure of the invention, generally designated as C, disposed on a conventional fluid storage tank T. The tank T contains, in its upper portion, a manhole aperture defined by an endless annular peripheral ring or collar 10 projecting upwardly from the tank. The manhole closure C includes a lid or head or cover member 12 which covers the collar 10 and is hingedly secured thereto by means of the hinge 15 disposed radially opposite the swing clamp 30. The elongated hinge aperture 17 provides for compression and wear of the gasket. The peripheral portion of the cover 12 is formed into an annular clamping ring 16 which extends outwardly slightly beyond and over the collar 10. The ring 16, which is formed integral with and forms a part of the cover 12, contains an endless peripheral cavity or groove 18 (FIG. 2) formed in its under surface for receiving the top portion 24 of the collar 10.

Disposed in the groove 18 is a resilient gasket, generally deisgnated as G, which functions to seal the joint between the cover 12 and the collar 10.

Means for releasably retaining the cover 12 on the collar 10 in fluid-tight relation are provided in the form of a conventional manually adjustable swing toggle clamp 30, rotatably secured to the collar 10 and positionable over the cover member 12. The ring 16 includes an outer upstanding clamping tongue 31, and the clamp includes an adjustable clamping lug 32 engageable with the tongue 31 to releasably clamp the cover on the collar.

The gasket is substantially V-shaped in cross-sectional configuration with the legs 34 and 36 of the V extending upwardly and outwardly into the groove 18.

The groove 18 is substantially T-shaped in cross-sectional configuration with the stem 40 of the T forming the groove entrance and with the "cross" 42 of the T forming the inner portion of the groove 18 and extending laterally on each side to form the spaced, upwardly facing shelves 44 and 46 interiorly of the groove.

The legs 34 and 36 of the gasket have laterally extending tabs 50 and 52, respectively, forming downwardly facing shoulders 54 and 56, for coacting engagement with the groove shelves 44 and 46, respectively, to securely retain the gasket within the groove 18.

Insertion of the gasket into the groove is effected by pressing the gasket legs 34 and 36 together and inserting such gasket entirely into the groove whereby the gasket leg shoulders 54 and 56 seat on the groove shelves 44 and 46 respectively. The outer side surfaces of each of the tabs 50 and 52 are tapered downwardly and outwardly to facilitate such insertion.

The upper or top edge portion 24 of the collar 10 is tapered upwardly and inwardly and terminates in a rounded upper edge 60. The entrance or mouth of the groove 18 is tapered downwardly and outwardly for receiving the coacting tapered top edge portion 24 of the collar. The bottom edge portion or seat 64 of the gasket is rounded for coacting, sealing engagement with the rounded top edge 60 of the collar.

In the FIGURE 3 modification, wherein like parts are identified by like symbols, the gasket 70 is substantially Y-shaped in cross-sectional configuration with the legs 72 and 74 of the Y extending upwardly and inwardly into the groove 78.

In the modification shown in FIGURE 4, the gasket is substantially U-shaped in cross-sectional configuration with the base 82 of the U being relatively large and thick, and with the legs 84 and 86 thereof being relatively small in length.

Although only one toggle clamp 30 may be employed, it is preferred that a pluraltiy (for example, eight) of such clamps be used. When only one clamp is used, it is disposed opposite the hinge 15. If a plurality of clamps are used, they are preferably evenly spaced around the periphery of the cover 12. Such plurality of clamps provides uniform pressure on the gasket in coaction with the slotted hinge 15.

A novel advantage of the clamps 30 is a "safe-lock" feature wherein pressure internally of the tank cannot blow the cover off once the clamps are loosened. More specifically, partial loosening of the clamp does not disengage the interlock between the clamp lug 32 and the cover tongue 31. Accordingly, when the clamps 30 are partially loosened, the cover 12 will rise a slight amount and thus vent any tank internal pressure to the atmosphere, after which the clamps may be completely loosened to disengage the interlock between the lug 32 and the tongue 31. Thus, with this construction, the lug 32 can not be thrown clear from the tongue 31 until tank internal pressure is relieved. In fact, the tank internal pressure keeps such lug and tongue in engagement until the pressure is relieved.

Thus, the invention provides a gasket construction wherein the gasket is securely retained in position, with such gasket being shielded from the product and from the elements to prevent premature deterioration. The gasket is well confined and supported—a requisite for high pressure sealing. Cleaning of the gasket is facilitated by its easy removal from the groove 18. The ring 16 provides strength and prevents undue distortion when clamping. The gasket may be formed of any suitable resilient material such as rubber, synthetic organic plastic, etc.

The terms and expressions which have been employed are used as terms of description, and not of limitation, and there is no intention, in the use of such terms and expressions, of excluding any equivalents of the features shown and described, or portions thereof, but it is recognized that various modifications are possible within the scope of the invention claimed.

I claim:

1. Closure means for a fluid-containing tank having in its upper portion a manhole aperture defined by an upwardly projecting endless peripheral collar, said closure means comprising; a cover member covering said peripheral collar and engageable with the top edge thereof and having its peripheral portion extending radially outwardly slightly beyond said collar; said cover member having an endess peripheral groove formed in its under surface for coacting, sealing engagement with the top edge of said collar; a resilient gasket disposed in said groove for sealing the joint between the cover member and the collar; means for releasably retaining said cover member on said collar in fluid-tight relation, said gasket being substantially V-shaped in cross-sectional configuration with the legs of the V extending upwardly and outwardly into the groove, said groove being substantially T-shaped in cross-sectional configuration with the stem of the T forming the groove entrance and with the cross of the T forming the inner portion of the groove and extending laterally on each side to form spaced, upwardly facing shelves interiorly of the groove; the legs of the V-shaped gasket having laterally extending tabs forming downwardly facing shoulders for coacting engagement with the groove shelves, respectively, to securely retain the gasket within the groove; insertion of the gasket into the groove being effected by pressing the legs of the V-shaped gasket together and inserting the same entirely into the groove whereby the gasket shoulders seat on the groove shelves, respectively.

2. The structure of claim 1 wherein the upper edge portion of the collar is tapered upwardly and inwardly terminating in a rounded upper edge of the collar; and the groove entrance is tapered downwardly and outwardly for receiving the tapered upper edge portion of the collar, the bottom portion of said gasket being rounded for coacting sealing engagement with the rounded upper edge of said collar.

3. The structure of claim 1 wherein the outer side surface of each of the tabs is tapered downwardly and outwardly to facilitate insertion of the gasket into the groove.

4. The structure of claim 2 wherein the cover member includes an endless peripheral ring contained on the periphery of such cover member, with said ring containing said groove.

5. Closure means for a fluid-containing tank having in its upper portion a manhole aperture defined by an upwardly projecting endless peripheral collar, said closure means comprising; a cover member covering said peripheral collar and engageable with the top edge thereof and having its pheripheral portion extending radially outwardly slightly beyond said collar; said cover member having an endless peripheral groove formed in its under surface for coacting, sealing engagement with the top edge of said collar; a resilient gasket disposed in said groove for sealing the joint between the cover member and the collar; means for releasably retaining said cover member on said collar in fluid-tight relation, the cover member including an endless peripheral ring contained on the periphery of the cover member, said ring containing said groove; said gasket being substantially V-shaped in cross-sectional configuration, with the legs of the V extending upwardly and outwardly into the groove; said groove being substantially T-shaped in cross-sectional configuration, with the stem of the T forming the groove entrance and with the cross of the T forming the inner portion of the groove and extending laterally on each side to form spaced, upwardly facing shelves interiorly of the groove; each of the legs of the V-shaped gasket having laterally extending tabs forming downwardly facing shoulders for coacting engagement with the groove shelves, respectively, to securely retain the gasket within the groove; insertion of the gasket into the groove being effected by pressing the legs of the V-shaped gasket together and inserting the same entirely into the groove whereby the gasket shoulders seat on the groove shelves, respectively; the upper edge portion of the collar being tapered upwardly and inwardly terminating in a rounded upper edge of the collar; the groove entrance being tapered downwardly and outwardly for receiving the tapered upper edge portion of the collar; the bottom portion of said gasket being rounded for coatcing sealing engagement with the rouned upper edge of said collar; the outer side surface of each of the tabs being tapered downwardly and outwardly to facilitate insertion of the gasket into the groove; said means including at least one manually adjustable clamp rotatively secured to the collar and positionable over the cover member to clamp the same firmly on the collar; said ring including an outer upstanding clamping tongue; said clamp including an adjustable clamping lug engageable with the tongue to clamp the cover member on the collar; and said means also including a hinge rotatively connecting the cover member to the collar and disposed radially opposite said clamp.

References Cited

UNITED STATES PATENTS

| | | | |
|---|---|---|---|
| 1,988,589 | 1/1935 | Gaston | 220—46 |
| 2,014,861 | 9/1935 | Neely | 220—46 |

FOREIGN PATENTS 719,477   12/1954   Great Britain.

JAMES B. MARBERT, *Primary Examiner.*